US010547728B2

(12) United States Patent
Moran et al.

(10) Patent No.: US 10,547,728 B2
(45) Date of Patent: Jan. 28, 2020

(54) DYNAMIC AGENT GREETING BASED ON PRIOR CALL ANALYSIS

(71) Applicant: Avaya Inc., Santa Clara, CA (US)

(72) Inventors: Thomas Moran, Galway (IE); Gerard Carty, Galway (IE)

(73) Assignee: Avaya Inc., Santa Clara, CA (US)

( * ) Notice: Subject to any disclaimer, the term of this patent is extended or adjusted under 35 U.S.C. 154(b) by 22 days.

(21) Appl. No.: 15/003,627

(22) Filed: Jan. 21, 2016

(65) Prior Publication Data
US 2017/0214779 A1    Jul. 27, 2017

(51) Int. Cl.
*H04M 1/64* (2006.01)
*H04M 3/51* (2006.01)
*G10L 15/26* (2006.01)
*G10L 15/18* (2013.01)
*G10L 15/08* (2006.01)

(52) U.S. Cl.
CPC ......... *H04M 1/642* (2013.01); *G10L 15/1815* (2013.01); *G10L 15/265* (2013.01); *H04M 3/5166* (2013.01); *G10L 2015/088* (2013.01)

(58) Field of Classification Search
CPC .. H04M 3/5233; H04M 3/42093; H04M 3/58; H04M 3/5191; H04M 3/5166; H04M 1/642; G10L 15/265; G10L 15/1815; G10L 2015/088
See application file for complete search history.

(56) References Cited

U.S. PATENT DOCUMENTS

| 5,596,634 | A  | * | 1/1997  | Fernandez  | H04M 3/42 379/207.12 |
| 5,873,032 | A  | * | 2/1999  | Cox        | H04M 3/42 455/417 |
| 6,430,271 | B1 | * | 8/2002  | DeJesus    | H04M 3/5166 379/265.13 |
| 7,043,008 | B1 | * | 5/2006  | Dewan      | H04M 3/42221 379/265.06 |
| 7,457,404 | B1 | * | 11/2008 | Hession    | H04M 3/5175 379/265.07 |
| 7,822,188 | B1 | * | 10/2010 | Kirchhoff  | H04M 3/436 379/211.02 |
| 8,576,270 | B1 | * | 11/2013 | Vitale     | H04M 3/53308 348/14.01 |
| 8,665,863 | B2 | * | 3/2014  | Silverman  | H04L 41/5038 370/352 |
| 9,667,793 | B2 | * | 5/2017  | Milstein   | G06Q 10/1097 |
| 9,955,021 | B1 | * | 4/2018  | Liu        | H04M 3/5232 |
| 2003/0043974 | A1 | * | 3/2003 | Emerson, III | H04L 29/06 379/88.13 |
| 2004/0230684 | A1 | * | 11/2004 | Smolinski | H04L 51/04 709/227 |

(Continued)

*Primary Examiner* — Lisa Hashem
(74) *Attorney, Agent, or Firm* — Sheridan Ross P.C.

(57) ABSTRACT

A contact center, communication system, and method are disclosed. An illustrative contact center includes a conversational analysis engine that is applied to media exchanged between a customer and a first agent during a first interaction and determines a context of the first interaction. The illustrative contact center further includes a repository of greetings for a second agent and a greeting from the repository of greetings for the second agent is selectable based on the determined context of the first interaction. The illustrative contact center further includes a network interface that facilitates a presentation of the selected greeting to the customer when the customer is transferred from the first agent to the second agent.

20 Claims, 7 Drawing Sheets

(56) References Cited

U.S. PATENT DOCUMENTS

| | | | |
|---|---|---|---|
| 2006/0203994 A1* | 9/2006 | Shaffer | H04M 3/51 379/266.01 |
| 2007/0147349 A1* | 6/2007 | Bangor | H04M 3/42068 370/352 |
| 2008/0037737 A1* | 2/2008 | Lenington | H04M 3/523 379/93.05 |
| 2009/0147941 A1* | 6/2009 | Druzhnikov | H04M 3/58 379/212.01 |
| 2009/0221274 A1* | 9/2009 | Venkatakrishnan | H04M 1/6505 455/417 |
| 2009/0222313 A1* | 9/2009 | Kannan | G06Q 30/02 705/7.31 |
| 2010/0104086 A1* | 4/2010 | Park | G10L 15/04 379/265.09 |
| 2010/0278318 A1* | 11/2010 | Flockhart | G10L 17/26 379/88.04 |
| 2011/0010173 A1* | 1/2011 | Scott | H04M 3/42221 704/235 |
| 2011/0307257 A1* | 12/2011 | Pereg | G06Q 10/063 704/251 |
| 2011/0307258 A1* | 12/2011 | Liberman | G10L 15/26 704/251 |
| 2012/0148040 A1* | 6/2012 | Desai | H04M 3/493 379/265.13 |
| 2013/0343205 A1* | 12/2013 | Dolan | H04M 3/2236 370/250 |
| 2014/0016762 A1* | 1/2014 | Mitchell | H04M 3/5175 379/88.14 |
| 2014/0270141 A1* | 9/2014 | Filonov | H04L 65/1006 379/265.07 |
| 2014/0314225 A1* | 10/2014 | Riahi | G06Q 30/02 379/265.09 |
| 2015/0213800 A1* | 7/2015 | Krishnan | H04M 3/4936 704/246 |
| 2015/0256677 A1* | 9/2015 | Konig | H04M 3/5191 379/265.09 |
| 2015/0304492 A1* | 10/2015 | Eyeson | H04M 3/5175 379/265.1 |
| 2016/0110422 A1* | 4/2016 | Roytman | G06N 5/00 706/12 |
| 2016/0352900 A1* | 12/2016 | Bell | H04M 3/5175 |
| 2017/0018015 A1* | 1/2017 | Varma | G06Q 30/0613 |
| 2018/0338040 A1* | 11/2018 | Carty | G06F 17/2705 |

\* cited by examiner

DYNAMIC AGENT GREETING BASED ON PRIOR CALL ANALYSIS

BACKGROUND

The present disclosure is generally directed to contact centers and, in particular, toward agent greetings in contact centers.

An "agent greeting" is a term used to refer to a pre-recorded announcement of or for an agent, and its primary purpose is to play a greeting prompt to a customer at the beginning of a call or prior to the beginning of a call. This has the primary objective of relieving the agent from the chore of repeating a standard greeting for every incoming call. While some contact centers make use of agent greetings, their use is often not optimized.

DETAILED DESCRIPTION

Figure 1:
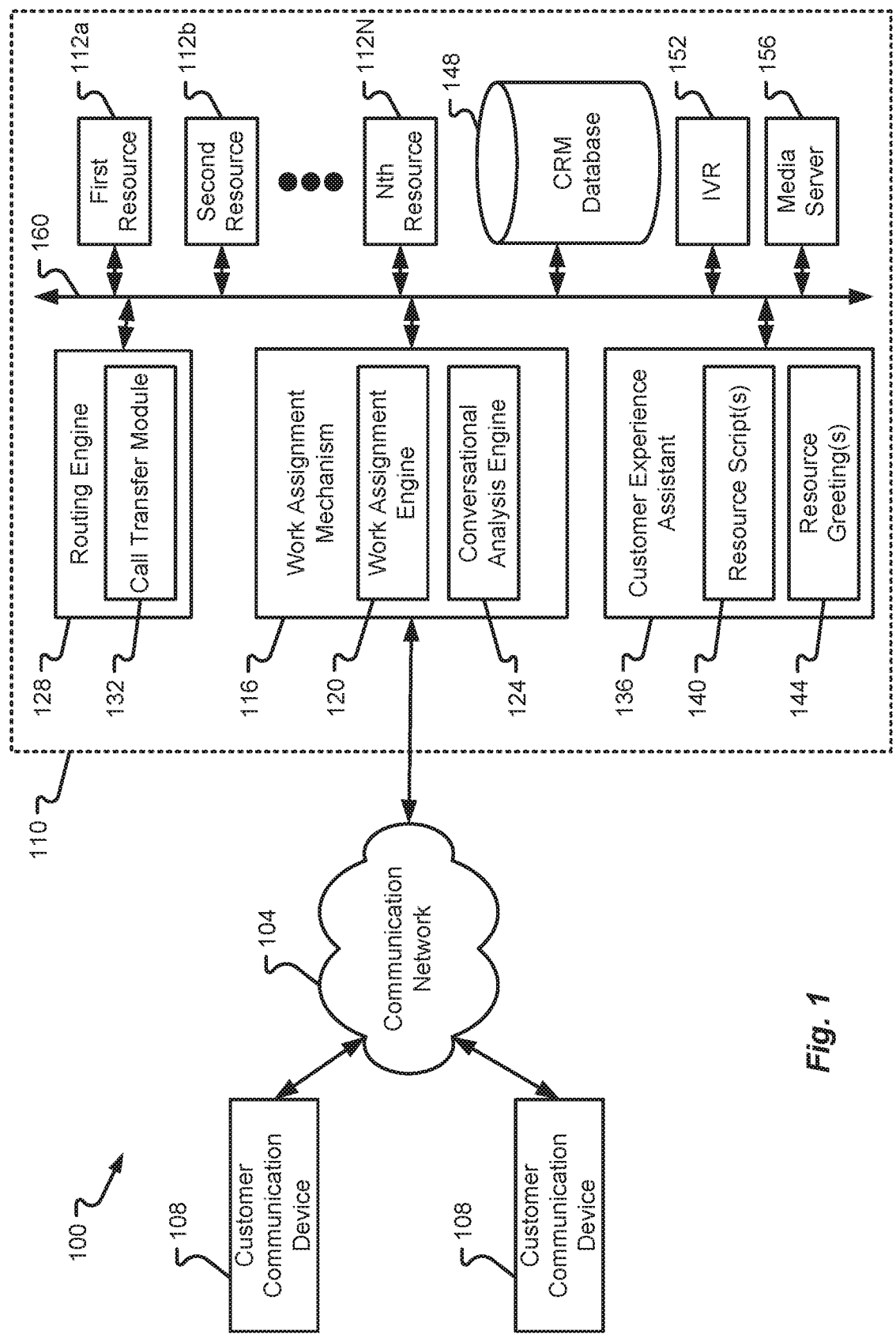
FIG. 1 depicts a block diagram of a communication system in accordance with at least some embodiments of the present disclosure.

Embodiments of the present disclosure will be described in connection with the execution of a contact center. In a contact center environment, there are many situations where an agent is unable to deal with a current customer call and, therefore, must transfer a call to another agent who is more skilled in dealing with the particular customer issue. In these cases, there may be a context of the conversation that has emerged during the initial call. This context has the potential to vary significantly from call-to-call or customer-to-customer. For instance, a customer may be frustrated or impatient during their first call with an agent, resulting in a first type of context whereas another customer may express a keen interest in a specific product or service during their first call with an agent, resulting in a second type of context.

When these different customers are transferred to a new agent, it would be desirable to customize the agent greeting that is played to the customers for the second call leg. Without such customization, the agent greeting played to both customers may be somewhat out of context or not suitable for the call that has previously occurred.

In some embodiments, a method, system, and contact center are proposed that enable a customization of agent greetings based on a context of a previous call or contact, for example. While embodiments of the present disclosure will be described in connection with calls, call analysis, and voice-based agent greetings, it should be appreciated that embodiments of the present disclosure are not so limited. In particular, the techniques described herein can be applied to non-voice contacts (e.g., SMS, email, chat, etc.), video contacts, and real-time and non-real-time contacts. The customized agent greetings provided to a customer based on context can be provided in any media type including, without limitation, voice, video, text, etc. The description of a call center should not be construed as limiting embodiments of the present disclosure or the claims to calls or voice-based contacts.

In addition, the disclosed techniques for customizing agent greetings can be utilized to increase functionality of an Interactive Voice Response (IVR) system. In some embodiments, an intelligent IVR system may utilize context from a customer's previous interaction with agents to adjust its IVR tree, scripts contained within the IVR tree, whether certain branches in the IVR tree are traversed or not, etc. Accordingly, the concepts disclosed herein can be used in customizing a customer's contact center experience beyond the customization of agent greetings.

In some embodiments, the disclosed techniques propose the ability to monitor incoming calls in a call center. As a non-limiting example, some or all incoming calls in a call center can be monitored by a conversational analysis engine in real-time or near-real-time. As the calls are monitored, the conversational analysis engine may (continuously or periodically) determine a context of the monitored call. The conversational analysis engine may be programmed to maintain a record of context results for the ongoing call and this can be used to dynamically select a specific agent greeting prompt for any subsequent agent that the customer may speak with (either during the current contact center interaction or during subsequent contact center interactions).

The context information obtained by the conversational analysis engine may be utilized to select a specific agent greeting from an array of agent greetings. In some embodiments, agents may be allowed to maintain an array of agent greetings that have been recorded by them or selected by them (or their supervisor) and stored in a computer readable medium. The decision of which agent greeting to play to a customer when that particular agent has a call transferred to them from another agent may, in some embodiments, depend upon the context of the customer's interaction with that previous agent (e.g., the transferor agent).

As a non-limiting example, in addition to a default or standard agent greeting prompt, an agent may also have other agent greetings stored in the computer readable medium for presentation to customers being transferred to or connected with the agent. One such agent greeting may be short and to the point, reflecting an urgency in the agent's desire to resolve the customer's issue quickly: "Hi, this is Joe Agent, I promise to do everything I can to resolve your issue immediately." Another agent greeting for that same agent may reflect the agent's skill or set of skills: "Hi, this is Joe Agent, if you have an issue with product X, then you are talking to the right person!" Another agent greeting for the same agent may reflect the agent's sense of humor: "Hi, this is Joe Agent, hope you are having a nice day, and when we're finished talking it'll be even nicer!!!" If a customer has their call transferred to Joe Agent, then the context of the previous call between the customer and the other agent may be used, at least in part, to decide which of the customized agent greetings to play to the customer. If the context is non-determinative (e.g., a decision on a particular agent greeting cannot be made based on known context), then a default agent greeting may be played for the customer during a transfer of that customer to Joe Agent.

With reference now to FIGS. 1-7, various examples or features capable of deployment with a contact center will be described in accordance with at least some embodiments of the present disclosure. The following description is not intended to limit the claims to any particular embodiment described in connection with a particular figure. To the contrary, elements from any of the figures may be combined with other elements from other figures to provide a functional and efficient contact center solution. For instance, the features of FIG. 1 or 2 may be adapted to perform some or all of the methods described in connection with any of FIGS. 4-7.

With reference initially to FIG. 1, an illustrative communication system 100 will be described in accordance with at least some embodiments of the present disclosure. The communication system 100 of FIG. 1 may be a distributed system and, in some embodiments, comprises a communication network 104 connecting one or more customer communication devices 108 to a work assignment mechanism 116, which may be owned and operated by an enterprise administering a contact center 110 in which a plurality of resources 112a-N are distributed to handle incoming work items from the customer communication devices 108.

In accordance with at least some embodiments of the present disclosure, the communication network 104 may comprise any type of known communication medium or collection of communication media and may use any type of protocols to transport messages between endpoints. The communication network 104 may include wired and/or wireless communication technologies. The Internet is an example of the communication network 104 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Voice over Internet Protocol (VoIP) network, a Session Initiation Protocol (SIP) network, a cellular network, and any other type of packet-switched or circuit-switched network known in the art. In addition, it can be appreciated that the communication network 104 need not be limited to any one network type, and instead may be comprised of a number of different networks and/or network types. The communication network 104 may comprise a number of different communication media such as coaxial cable, copper cable/wire, fiber-optic cable, antennas for transmitting/receiving wireless messages, and combinations thereof.

The communication devices 108 may correspond to customer communication devices. In accordance with at least some embodiments of the present disclosure, a customer may utilize their communication device 108 to initiate a work item, which is generally a request for a processing resource 112. Illustrative work items include, but are not limited to, a contact or call directed toward and received at a contact center, a web page request directed toward and received at a server farm (e.g., collection of servers), a media request, an application request (e.g., a request for application resources located on a remote application server, such as a SIP application server), and the like. The work item may be in the form of a message or collection of messages transmitted over the communication network 104. For example, the work item may be transmitted as a telephone call, a video call, a packet or collection of packets (e.g., IP packets transmitted over an IP network), an email message, an Instant Message, an SMS message, a fax, and combinations thereof. In some embodiments, the communication may not necessarily be directed at the work assignment mechanism 116, but rather may be on some other server in the communication network 104 where it is harvested by the work assignment mechanism 116, which generates a work item for the harvested communication. An example of such a harvested communication includes a social media communication that is harvested by the work assignment mechanism 116 from a social media network or server.

The format of the work item may depend upon the capabilities of the communication device 108 and the format of the communication. In particular, work items are logical representations within contact center 110 of work to be performed in connection with servicing a communication received at the contact center 110 (and more specifically the work assignment mechanism 116). The communication may be received and maintained at the work assignment mechanism 116, a switch or server connected to the work assignment mechanism 116, or the like until a resource 112 is assigned to the work item representing that communication at which point the work assignment mechanism 116 passes the work item to a routing engine 128 to connect the communication device 108 to the assigned resource(s) 112.

Although the routing engine 128 is depicted as being separate from the work assignment mechanism 116, the routing engine 128 may be incorporated into the work assignment mechanism 116 or its functionality may be executed by the work assignment engine 120.

In accordance with at least some embodiments of the present disclosure, the communication devices 108 may comprise any type of known communication equipment or collection of communication equipment. Examples of a suitable communication device 108 include, but are not limited to, a personal computer, laptop, tablet, cellular phone, smartphone, telephone, or combinations thereof. In general, each communication device 108 may be adapted to support video, audio, text, and/or data communications with other communication devices 108 as well as the processing resources 112. The type of physical medium used by the communication device 108 to establish a communication channel or multiple communication channels with the resources 112 of the contact center may depend upon the capabilities of the communication device 108, the capabilities of the contact center and the contact center resources 112, the type of network 104 connecting the communication device(s) 108 with the resources 112, etc. It should be appreciated that any media type may be used to exchange communications between a customer and resource 112 and one or a plurality of communication channels (e.g., physical or logical pathways) may carry these different media types.

In addition to including resources 112a-N, a work assignment mechanism 116, and a routing engine 128, the contact center 110 may further include a customer experience assistant 136, a Customer Relationship Management (CRM) database 148, an IVR system 152, and a media server 156. Some or all of the components of the contact center 110 may be in communication with one another via an internal enterprise or protected communication network 160. The protected communication network 160 may correspond to or include a LAN, WAN, VPN, or combinations thereof that are separated from the broader communication network 104 via a firewall or the like. In some embodiments, the protected communication network 160 may be administered according to security policies/preferences of an entity deploying the contact center 110, which may be different from security policies/preferences of the broader communication network 104.

The work assignment mechanism 116 (or a server deploying the work assignment mechanism 116) may further include or have access to a conversational analysis engine 124 that is configured to analyze customer interactions with agents in real-time, near-real-time, or after a call is completed (e.g., post hoc) and determine a context associated with the customer/agent interaction. In some embodiments, the conversational analysis engine 124 may correspond to a set of instructions stored in computer memory that, when executed by a microprocessor, enable the contact center 110 to operate a contact center that is customizable to a customer's experience.

As will be discussed in further detail herein, the conversational analysis engine 124 may work in concert with a call transfer module 132 of the routing engine 128 and the customer experience assistant 136 to help identify an appropriate agent/resource greeting 144 to play to a customer when that customer is being transferred from one agent or resource (e.g., a first resource 112a) to a different agent or resource (e.g., a second resource 112b). In some embodiments, the conversational analysis engine 124 may determine context associated with a customer/agent interaction and provide that context information to the customer experience assistant 136 to select an appropriate agent/resource greeting 144. The agent/resource greeting 144 selected by the customer experience assistant 136 may then be provided to the routing engine 128, which uses the call transfer module 132 to both transfer the customer to the new agent and present the selected agent/resource greeting 144 to the customer prior to connecting the new agent with the customer.

In addition to providing context information to the customer experience assistant 136, the conversational analysis engine 124 may further provide the context information for storage into the CRM database 148. Once stored, the context information may be associated with the customer that was involved in the call. Alternatively or additionally, the context information may be associated with the agent that was initially involved in the call or the agent that had the call transferred thereto. The context information can be used for other purposes in addition to selecting resource greeting(s) 144. For example, the context information can be used for training purposes, post-call analytics, improving customer service, etc.

As can be appreciated, components of the contact center 110 other than the call transfer module 132 may be used to present the selected agent/resource greeting 144 to the customer. As one non-limiting example, the selected agent/resource greeting 144 may be presented to the customer via the IVR system 152. As another non-limiting example, the selected agent/resource greeting 144 may be presented to the customer via the media server 156. As still another non-limiting example, the selected agent/resource greeting 144 may be presented to the customer via the communication device of the new agent (e.g., the second resource 112b).

In addition to the agent/resource greeting(s) 144, the customer experience assistant 136 may also include agent/resource script(s) 140. These scripts 140, as opposed to greetings 144, may be presented to the resource 112 or agent handling a work item for a customer. In some embodiments, the scripts 140 may present the resource 112 or agent with the context information obtained by the conversational analysis engine 124, thereby enabling the resource 112 or agent to have an awareness of the customer's context prior to interacting with the customer. The resource script(s) 140 may alternatively or additionally be updated to assist the resource 112 or agent as they interact with a customer and additional context is developed. These scripts 140 may be presented as whisper pages to the resource 112 or agent, as screen pops, or the like. Again, the resource script(s) 140 differ from the agent/resource greeting(s) 144 in that the greetings 144 are presented to customers whereas scripts 140 are presented to resource 112 or agents.

The resource script(s) 140 and/or resource greeting(s) 144 may be provided to the appropriate communication device directly from the customer experience assistant 136 (or a server implementing the same). Alternatively or additionally, the customer experience assistant 136 may leverage other components of the contact center 110 to deliver the resource script(s) 140 and/or resource greeting(s) 144. For instance, the customer experience assistant may utilize the call transfer module 132, the IVR 152, or a media server 156 to deliver the script(s) 140 and/or resource greeting(s) 144. In particular, the resource script(s) 140 and/or resource greeting(s) 144 may be formatted as one or more media files that are accessible to the IVR 152 or media server 156 and can be streamed as media to either the customer communication device 108 or resource 112a-N, as appropriate. The media files may be read out of the customer experience assistant 136 and played by the playing entity (e.g., transfer module 132, IVR 152, media server 156, etc.) or otherwise delivered in a delivery format specific to the media files. As can be appreciated, the resource script(s) 140 and/or resource greeting(s) 144 can be provided in any format including, without limitation, audio, video, text, or combinations thereof.

In accordance with at least some embodiments of the present disclosure, the work item of a customer can be sent toward a collection of processing resources 112a-N via the combined efforts of the work assignment mechanism 116 and routing engine 128. The resources 112 can either be completely automated resources (e.g., Interactive Voice Response (IVR) systems, processors, servers, or the like), human resources utilizing communication devices (e.g., human agents utilizing a computer, telephone, laptop, etc.), or any other resource known to be used in contact centers.

As discussed above, the work assignment mechanism 116 and resources 112 may be owned and operated by a common entity in a contact center format. In some embodiments, the work assignment mechanism 116 may be administered by multiple enterprises, each of which has their own dedicated resources 112 connected to the work assignment mechanism 116.

In some embodiments, the work assignment engine 120 enables the work assignment mechanism 116 to make intelligent routing decisions for work items (either initial routing decisions or transfer routing decisions). In some embodiments, the work assignment engine 120 can determine which of the plurality of processing resources 112a-N is qualified and/or eligible to receive the work item and further determine which of the plurality of processing resources 112a-N is best suited (or is the optimal processing resource) to handle the processing needs of the work item.

Although the work assignment mechanism 116, routing engine 128, and customer experience assistant 136 are depicted as being separate components of the contact center 110, it should be appreciated that these elements may be combined partially or entirely. For example, the work assignment mechanism 116 may deploy the customer experience assistant 136. Alternatively or additionally, the work routing engine 128 may deploy one or more components of the work assignment mechanism 116 and/or customer experience assistant 136.

Figure 2:
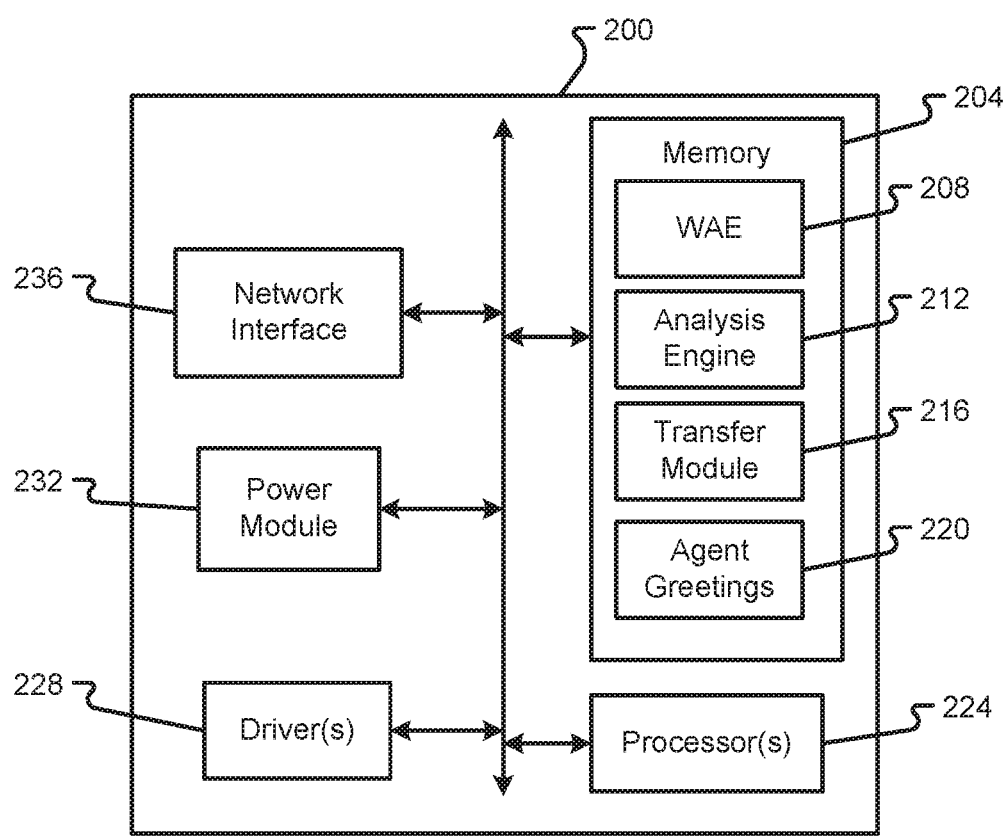
FIG. 2 is a block diagram depicting components of a server used in a contact center in accordance with at least some embodiments of the present disclosure.

With reference now to FIG. 2, additional details of a server 200 that may be used within a contact center 110 will be described in accordance with at least some embodiments of the present disclosure. The server 200 is shown to include computer memory 204 that stores one or more instructions sets, applications, or modules, potentially in the form of a work assignment engine 208, an analysis engine 212, a transfer module 216, and/or agent greetings 220. Although not shown, the server 200 may further include other components of the various servers depicted in FIG. 1 including, without limitation, the customer experience assistant 136, the IVR system 152, and/or the media server 160. In other words, the server 200 may include any or all of the components of the contact center 110 depicted in FIG. 1. The server 200 is also shown to include a processor 224, one or more drivers 228, a power module 232, and a network interface 236.

The memory 204 may correspond to any type of non-transitory computer-readable medium. In some embodiments, the memory 204 may comprise volatile or non-volatile memory and a controller for the same. Non-limiting examples of memory 204 that may be utilized in the server 200 include RAM, ROM, buffer memory, flash memory, solid-state memory, or variants thereof. Any of these memory types may be considered non-transitory computer memory devices even though the data stored thereby can be changed one or more times.

The applications/instructions 208, 212, 216, 220 may correspond to any type of computer-readable instructions or files storable in memory 204. The functionality of the work assignment engine 208 may be similar or identical to the functionality provided by work assignment engine 120 or the work assignment mechanism 116. The functionality provided by the analysis engine 212 may be similar or identical to the functionality provided by the conversational analysis engine 124. The functionality provided by the transfer module 216 may be similar or identical to the functionality provided by the call transfer module 132. The agent greetings 220 may be stored as media files or scripts and may be similar or identical to the resource greeting(s) 144. FIG. 2 is illustrative for purposes of showing a single server implementing all of the possible contact center modules described in connection with FIG. 1. It should be appreciated that a server 200 may implement only a subset of the applications/instruction sets stored in memory 204. Furthermore, it should be appreciated that a contact center 110 may include two or more servers with redundant or non-redundant functions.

The processor 224 may correspond to one or many microprocessors that are contained within a common housing, circuit board, or blade with the memory 204. The processor 224 may be a multipurpose, programmable device that accepts digital data as input, processes the digital data according to instructions stored in its internal memory, and provides results as output. The processor 224 may implement sequential digital logic as it has internal memory. As with most microprocessors, the processor 224 may operate on numbers and symbols represented in the binary numeral system.

The driver(s) 228 may correspond to hardware, software, and/or controllers that provide specific instructions to hardware components of the server 200, thereby facilitating their operation. For instance, the network interface 236 and/or memory 204 may each have a dedicated driver 228 that provides appropriate control signals to effect their operation. The driver(s) 228 may also comprise the software or logic circuits that ensure the various hardware components are controlled appropriately and in accordance with desired protocols. For instance, the driver 228 of the network interface 236 may be adapted to ensure that the network interface 236 follows the appropriate network communication protocols (e.g., TCP/IP (at one or more layers in the OSI model), UDP, RTP, GSM, LTE, Wi-Fi, etc.) such that the network interface 236 can exchange communications via the communication network 104. As can be appreciated, the driver(s) 228 may also be configured to control wired hardware components (e.g., a USB driver, an Ethernet driver, fiber optic communications, etc.).

The network interface 236 may comprise hardware that facilitates communications with other communication devices over the communication network 104. As mentioned above, the network interface 236 may include an Ethernet port, a Wi-Fi card, a Network Interface Card (NIC), a cellular interface (e.g., antenna, filters, and associated circuitry), or the like. The network interface 236 may be configured to facilitate a connection between the server 200 and the communication network 104 and may further be configured to encode and decode communications (e.g., packets) according to a protocol utilized by the communication network 104.

The power module 232 may include a built-in power supply (e.g., battery) and/or a power converter that facilitates the conversion of externally-supplied AC power into DC power that is used to power the various components of the server 200. In some embodiments, the power module 232 may also include some implementation of surge protection circuitry to protect the components of the server 200 from power surges.

Figure 3:
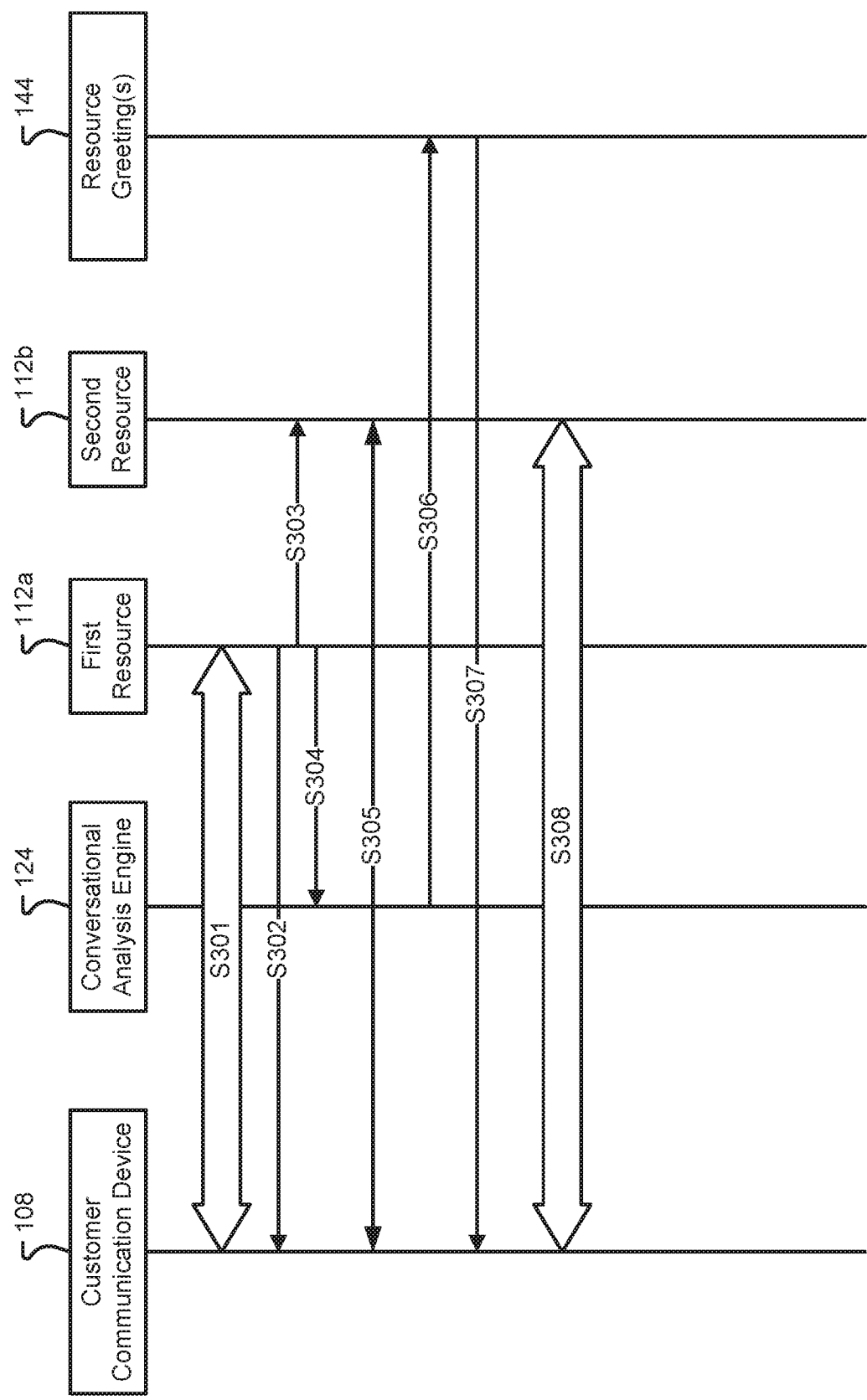
FIG. 3 is a diagram depicting a first set of communication flows in accordance with at least some embodiments of the present disclosure.

With reference now to FIG. 3, a first set of communication flows will be described in accordance with at least some embodiments of the present disclosure. The communication flows begin when a customer is engaged in a first communication session (step S301) with a first agent using a communication device (e.g., the first resource 112*a*). In particular, the first customer may be utilizing their customer communication device 108 to exchange voice, video, and/or text-based communications with the first resource 112*a* using the communication network 104 and a communication protocol negotiated between the first resource 112*a* and customer communication device 108. During the first communication session, the conversational analysis engine 124 may be monitoring the media exchanged between the customer and agent as well as the context of the communications between the customer and agent. This analysis may be done utilizing a speech-to-text converter, a natural language processor, and other analytics tools. Alternatively or additionally, the conversational analysis engine 124 may analyze the raw media (e.g., audio or video) of the communication session. For instance, the conversational analysis engine 124 may analyze the communication session for various keywords, enhanced signal amplitude or volume, gestures (e.g., with video analytics), etc.

As the conversational analysis engine 124 determines context about the first communication session, the conversational analysis engine 124 may store this contextual information, cause the contextual information to be stored in the CRM database 148, or share the contextual information with other components of the contact center 110.

At some point during the first communication session, the decision may be made to transfer the customer to another resource or agent. This decision may be made and requested by the customer (e.g., "Please transfer me to your supervisor"). Alternatively or additionally, the decision may be made by the first agent (e.g., "I cannot help you with that request, but please let me transfer you to someone who can"). Alternatively or additionally, the conversational analysis engine 124 may automatically determine that a transfer should occur based on the context of the first communication session. This automatically-initiated transfer may occur in response to determining that the customer's needs are not being met by the first agent based on the context of the first communication session.

In this first communication flow, after a decision has been made to transfer, the first resource 112a uses their device to initiate a directed transfer to a second resource 112b known to the first resource 112a. In other words, this particular communication flow allows the first resource 112a to directly transfer the customer to the second resource 112b having a known extension in the contact center 110, rather than passing the customer back to the work assignment engine 120 for assignment to an unknown resource. The transfer is initiated with the first resource 112a transmitting transfer signaling to the customer communication device (step S302), to the second resource 112b (step S303), and to the conversational analysis engine 124 (step S304). These transfer signals may be transmitted simultaneously or in any order. The transfer signaling transmitting in these steps may include a SIP INVITE message, an INVITE with Replaces message, a REFER message, or the like.

In some embodiments, the transfer signaling sent to the customer communication device 108 may include addressing information for the second resource 112b and the transfer signaling sent to the second resource 112b may include addressing information for the customer communication device 108. In some embodiments, the two devices may be pointed toward a common conference bridge in the contact center 110 or the two devices may be pointed toward one another for a direct communication.

The customer communication device 108 and second resource 112b begin exchanging information with one another to negotiate their upcoming communication session (step S305). This exchange may include an exchange of Session Description Protocol (SDP) information, protocol preferences, codec preferences, media capabilities, security preferences/requirements, etc.

Before, during, or after this exchange, the conversational analysis engine 124 may provide context information obtained during the first communication session to the customer experience assistant 136 to obtain a selected resource greeting 144 to present to the customer prior to connecting the customer with the second resource 112b (step S306). The context information received from the conversational analysis engine 124 may be used by the customer experience assistant 136 to select an appropriate resource greeting 144, which is then presented to the customer on their communication device 108 (step S307). As mentioned above, the selected resource greeting 144 may be presented directly from the customer experience assistant 136, by an IVR system 152, by a media server 156, and/or by the communication device of the second agent prior to connecting the customer with the second agent.

After the selected resource greeting 144 has been presented to the customer, the customer is then connected with the second resource 112b, thereby resulting in the establishment of a second communication session (step S308). At this point, the second agent and customer are able to exchange media with one another and interact such that the second agent can try to complete a work item associated with the customer. As can be appreciated, the conversational analysis engine 124 may further analyze the context of the second communication session as it did with the first communication session. It should also be appreciated that the delivery of a customized resource greeting 144 can be delivered to a customer in subsequent transfers of the customer. Specifically, if a customer is first transferred from one agent to another agent, a first selected resource greeting 144 may be delivered to the customer for the first transfer. If the customer is later transferred (e.g., subject to a second transfer) to yet another agent or back to the original agent, then a second selected resource greeting 144 (which may be different from the first selected resource greeting 144) can be delivered to the customer. Thus, the concept of delivering selected resource greetings 144 can be performed multiple times during a single customer interaction with a contact center.

Although the various message exchanges of FIG. 3 were described in connection with components depicted in FIG. 1, it should be appreciated that the server 200 or multiple instances of the server 200 may perform some or all of the functions described in connection with FIG. 3.

Figure 4:
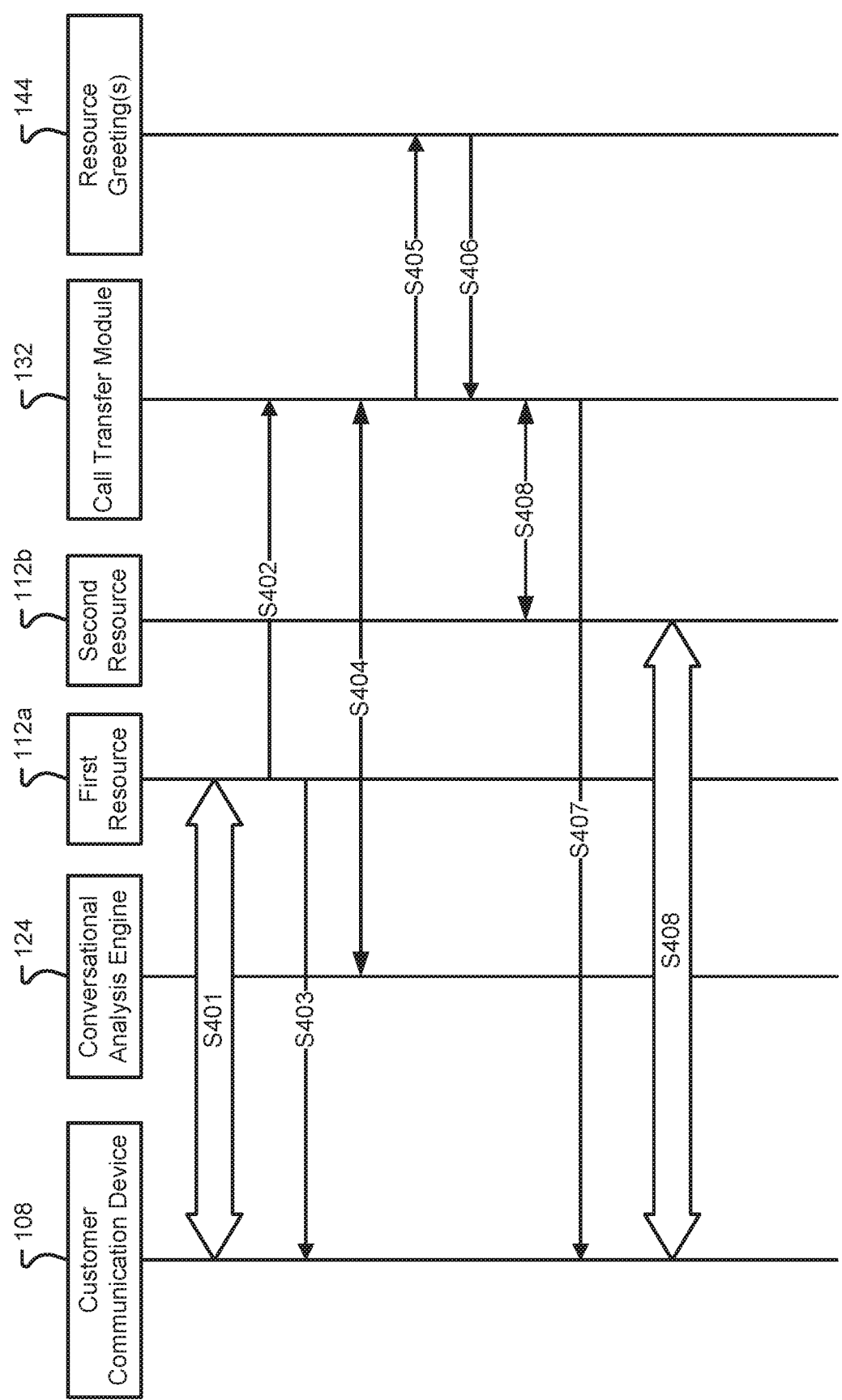
FIG. 4 is a diagram depicting a second set of communication flows in accordance with at least some embodiments of the present disclosure.

With reference now to FIG. 4, a second set of communication flows will be described in accordance with at least some embodiments of the present disclosure. The communication flows begin when a first communication session is established between the customer and a first resource 112a (step S401). This first communication session may correspond to an exchange of voice, video, text, and/or data between the customer communication device 108 and the first resource 112a.

During the first communication session, the conversational analysis engine 124 may analyze the media and/or data exchanged between the customer and first resource 112a to determine a context associated with the first communication session. The context may include an identification of keywords communicated during the first communication session, an identification of customer mood (e.g., happy, angry, satisfied, confused, interested in addition products/services, requesting supervisor, etc.).

As the first communication session progresses, a determination may be made to transfer the customer to a second resource 112b. As with the communication flow of FIG. 3, this determination may be made by the first resource 112a, by the customer, by the conversational analysis engine 124, or by some other mechanism. In response to making this determination, the flow continues with the first resource 112a (or some other mechanism in the contact center 110) transmitting transfer signaling to a call transfer module 132 and to the customer communication device 108 (steps S402 and 403). These steps may be performed simultaneously or in any sequential order.

The conversational analysis engine 124 may further provide the context information regarding the first communication session to the call transfer module 132 (step S404). This particular step may also occur before, simultaneous with, or after the performance of steps S402 and/or S403. In some embodiments, the conversational analysis engine 124 may be triggered to begin communicating with the call transfer module 132 when it is determined that the customer is being transferred.

Upon receiving a notification that a transfer is going to occur and upon receiving context information from the conversational analysis engine 124, the call transfer module 132 may transmit some or all of the context information to the customer experience assistant 136 to obtain a selected resource greeting 144 (step S405). The appropriate resource greeting may be selected based on the context of the first communication session. For example, if the context of the first communication session indicates that the customer is frustrated or unhappy, then a first resource greeting 144 specifically designated for use with unhappy or frustrated customers may be selected. As another example, if the context of the first communication session indicates that the customer is interested in additional services, then a second resource greeting 144 specifically designated for upsale opportunities may be selected. As another example, if the context of the first communication session indicates that the customer is being transferred to speak with a technical specialist (e.g., an agent with certain skills), then a third resource greeting 144 specifically highlighting the agent's skills may be selected.

The selected resource greeting 144, or an identifier thereof, may then be provided back to the call transfer module 132 (or some other component that presents the greeting 144 to the customer) (step S406). The call transfer module 132 may then communicate with the second resource 112b (step S408) to determine addressing for the second resource 112b and to begin the process of connecting the second resource 112b to the customer communication device 108. However, prior to establishing the complete connection between the customer and second resource 112b, the call transfer module 132 may present the selected resource greeting 144 to the customer via the customer communication device 108 (step S407).

In other embodiments, the second resource 112b may be connected with the customer, but media from the second resource 112b may not be played to the customer communication device 108. For example, the second resource 112b can hear the presentation of the selected resource greeting 144 to the customer and the customer's initial reaction, but cannot provide their own media to the customer until after a complete presentation of the selected resource greeting 144. This may be achieved by connecting the customer communication device 108, the second resource 112b, and the component presenting the selected resource greeting 144 to a common conference bridge, but muting the input of the second resource 112b.

After presentation of the selected resource greeting 144, the second resource 112b is fully connected with the customer communication device 108, and a second communication session is enabled (step S408).

Although the various message exchanges of FIG. 4 were described in connection with components depicted in FIG. 1, it should be appreciated that the server 200 or multiple instances of the server 200 may perform some or all of the functions described in connection with FIG. 4.

Figure 5:
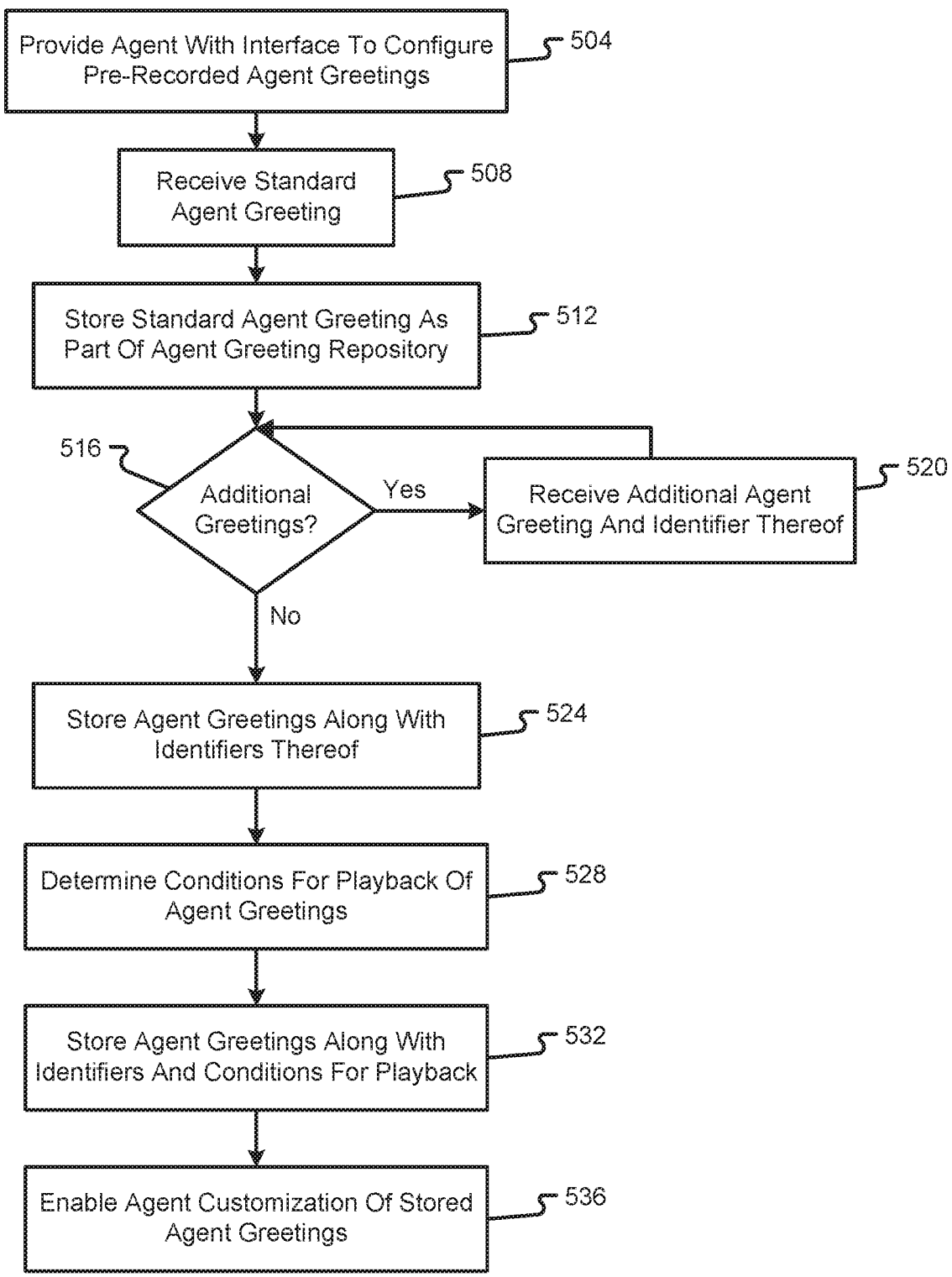
FIG. 5 is a flow diagram depicting a method of enabling an agent to update their agent greetings in accordance with at least some embodiments of the present disclosure.

With reference now to FIG. 5, a method of enabling an agent to update their greetings 144 will be described in accordance with at least some embodiments of the present disclosure. The method begins by providing an agent or resource with an interface to configure one or more pre-recorded agent greetings 144 (step 504). The interface provided to the agent or resource may include, without limitation, a Graphical User Interface (GUI), a Telephone User Interface (TUI), or any other type of interface that enables a person to interact with a computer or server. One non-limiting example of technology that may be used to deliver the GUI to the agent or resource is a web interface, such as an HTML interface or the like.

The agent or resource may be allowed to initially configure or select a standard agent greeting (step 508). This standard agent greeting may correspond to a greeting that will be provided in the absence of useful or determinable context. One example of a standard agent greeting may correspond to a voice or video recording of the agent saying, "Hello, my name is Agent Amy, how may I help you today?" The standard agent greeting may be useable in a number of different circumstances and may be presented to a customer prior to an initial interaction with an agent or prior to a customer being transferred to an agent where the customer's initial interaction with a first agent did not result in the development of context that enabled the selection of an agent greeting other than the standard agent greeting.

After the standard agent greeting has been prepared or selected by the agent, the standard agent greeting is stored as a part of an agent greeting repository for that particular agent (step 512). In some embodiments, the greeting may be stored with an indication that the greeting is a standard or default agent greeting.

The method continues by determining whether there are any additional greetings that the agent desires or is required to have (step 516). If this query is answered affirmatively, then the method proceeds by enabling the agent to provide those additional greetings and identifiers thereof (step 520). As each subsequent greeting is received, an indicator of context or conditions associated with use of that greeting may then be linked with the greeting in step 520. For instance, the agent may record a greeting for customers that are upset, a greeting for customers that are being transferred to help with additional questions or have different skill requirements, a greeting for happy customers, a greeting for customers that are upgrading service, a greeting for customers having technical difficulties with products, a greeting for customers having warranty issues, a greeting for customers that are distracted or require special attention, etc. Each greeting may have an identifier of that greeting and, potentially, conditions for using the agent greeting. These various recorded agent greetings may then be stored in the customer experience assistant 136 or may be stored in a database that is accessible to the customer experience assistant 136 (step 524).

In some embodiments, the agent greetings may be stored along with their identifiers and conditions for use of each agent greeting (steps 528, 532). Once stored, the agents in the contact center 110 may be provided with the ability to further customize or modify their stored agent greetings, record new agent greetings, delete agent greetings, etc. (step 536). These modifications may be made via the interface that enabled the agent to initially create the greetings and/or via some other portal that enables the agent to access the greetings in their repository. Access to these greetings may be protected via password protection or via some other protection mechanism.

Figure 6:
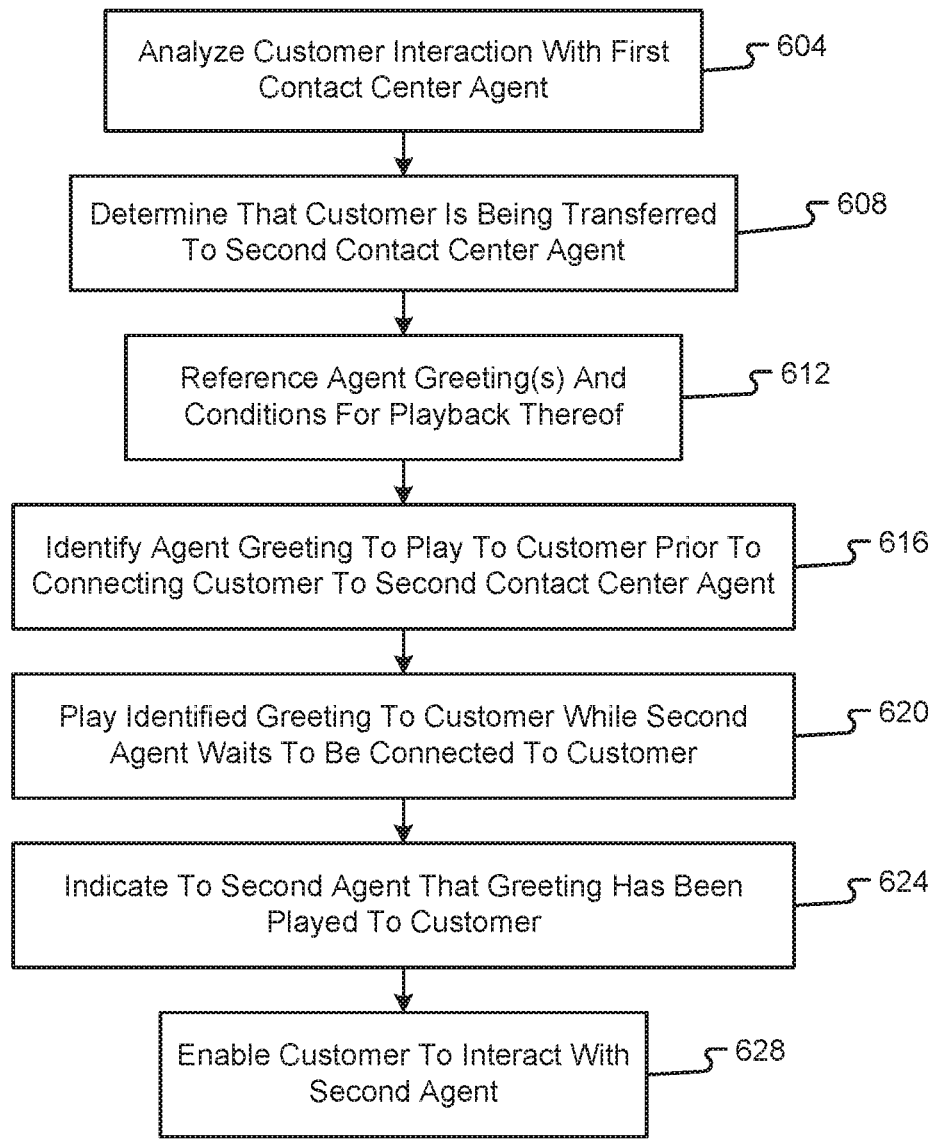
FIG. 6 is a flow diagram depicting a method of customizing an agent greeting for a customer in accordance with at least some embodiments of the present disclosure.

With reference now to FIG. 6, a method of customizing an agent greeting for presentation to a customer will be described in accordance with at least some embodiments of the present disclosure. The method begins with a conversational analysis engine 124 analyzing a customer interaction with a first contact center agent (e.g., a first resource 112a) (step 604). The contextual analysis may be performed in real-time, near-real-time, periodically, or continuously. The portions of the interaction that may be analyzed include, without limitation, words or phrases uttered during the interaction, tone of speaking participants, gestures/non-verbal cues, volume of speaking participants, changes in tone or volume, changes in frequency of speaking, extended periods of silence, changes in speech patterns, combinations thereof, etc. The analysis may result in a determination of context for the customer's interaction with the first agent. The type of context that may be determined for the interaction can include emotions of the customer (e.g., happy, angry, frustrated, disappointed, excited, confused, tired, willing to be upsold, etc.), emotions of the agent (e.g., happy, angry, frustrated, disappointed, excited, confused, tired, etc.), products or services discussed, skills required to complete the work item, etc. This contextual information may be maintained at the conversational analysis engine 124, may be transferred to another component of the contact center 110, may be stored in the CRM database 148, or combinations thereof.

Eventually, it is determined that the customer is being transferred to a second agent in the contact center 110 (e.g., a second resource 112b) (step 608). This may be determined in response to detecting a request by the customer to be transferred, in response to receiving transferring signaling from the first agent's phone, in response to a request for a supervisor, etc.

While the transfer process is carried out, the method continues by referencing the repository of agent greetings for the second agent that will receive the customer upon completion of the transfer (step 612). Additionally, conditions for playing back various agent greetings assigned to that second agent are referenced and mapped to the context information determined for the customer's interaction with the first agent. This identification and mapping enable a selection of an appropriate agent greeting 144 based on the context of the original interaction between the customer and the first agent (step 616).

As can be appreciated, and as a non-limiting example, if the second agent has pre-recorded three different agent greetings, then each of those greetings may have different conditions for presentation to the customer. A first of the greetings may be a standard or default greeting that is played for the customer if no determinable context is obtained from the customer's interaction with the first agent. A second of the greetings may be conditioned for presentation to customers that were generally happy or satisfied with their interaction with the first agent and are looking for additional services or skills to resolve their questions. A third of the greetings may be conditions for presentation to customer that were generally unhappy or dissatisfied with their interaction with the first agent and are looking for additional help. If the context of the customer's interaction with the first agent suggests that the customer was happy with the first agent, then the second greeting may be identified from the repository of the second agent's greetings. If the context of the customer's interaction with the first agent suggests that the customer was unhappy with the first agent, then the third greeting may be identified from the repository of the second agent's greetings. If the context of the customer's interaction with the first agent can neither suggest that the customer was happy or unhappy with the first agent, then the first greeting may be identified from the repository of the second agent's greetings.

The method continues by presenting or playing the identified and selected agent greeting from the repository of the second agent's greetings while the second agent waits to be connected to the customer (step 620). As can be appreciated, the second agent may be partially connected with the customer at this time such that the second agent can also hear the presentation of the agent greeting, but the second agent's inputs (audio or video) may be muted or blocked from being presented to the customer. Eventually, the presentation of the selected agent greeting concludes at which point the second agent receives an indication that the greeting presentation is completed (step 624). This indication may be in the form of a flashing light, a screen pop, an audio cue played to the second agent, etc. Thereafter, the second agent and customer are allowed to interact with one another via any media type (e.g., voice, video, text, chat, email, etc.) (step 628).

Figure 7:
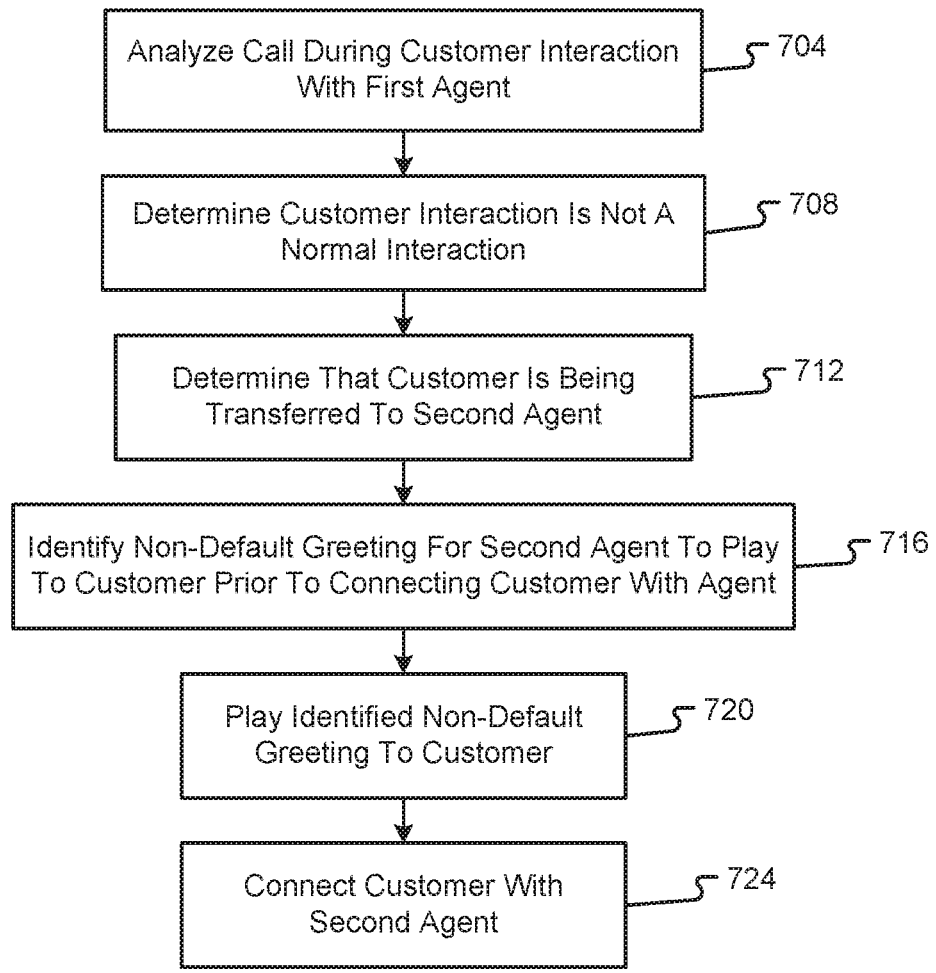
FIG. 7 is a flow diagram depicting another method of customizing an agent greeting for a customer in accordance with at least some embodiments of the present disclosure.

With reference now to FIG. 7, another method of customizing an agent greeting for a customer will be described in accordance with at least some embodiments of the present disclosure. The method begins by employing a conversational analysis engine to analyze a call or interaction between a customer and first agent (step 704). This step may be similar to the analyzing step 604 of FIG. 6.

During the interaction, it may be determined that the customer interaction with the first agent is not a normal interaction (step 708). This determination may be made in a number of ways. As one example, a threshold number of keywords (e.g., "confused", "stupid", "cool", "neat", "why", "how", "when", "supervisor", "thanks", etc.), keyword types (e.g., angry-type keywords, happy-type keywords, satisfied-type keywords, confused-type keywords, dissatisfied-type keywords, etc.), phrases (e.g., "I am lost", "I need to speak to a supervisor", "thanks for your help", etc.), may be defined. If the conversational analysis engine 124 detects an occurrence of those keywords, keyword types, or phrases in excess of the threshold number, then the conversational analysis engine 124 may determine that the interaction is not normal. The conversational analysis engine 124 may further determine the way in which the interaction is not normal based on the keywords, keyword types, or phrases that exceeded the threshold number. For instance, if more than the threshold number of satisfied-type keywords are detected, then the conversational analysis engine 124 may determine that the interaction is one in which the customer is very satisfied with the first agent. As another example, if more than the threshold number of angry phrases are detected, then the conversational analysis engine 124 may determine that the interaction is one in which the customer is angry.

Based on the determination made by the conversational analysis engine 124, the method continues when it is determined that the customer is being transferred to a second agent (step 712). This step may be similar to step 608 in FIG. 6.

The determination made by the conversational analysis engine 124 is then used to identify a non-default agent greeting for the second agent to play to the customer prior to connecting the customer with the second agent (step 716). Again, this step may involve mapping the determined context for the customer's interaction with the first agent against conditions for playback associated with the various agent greetings stored in the second agent's greetings repository.

The appropriate non-default agent greeting is identified in this mapping step and then presented to the customer (step 720). The format of the non-default agent greeting may depend upon the media used during the customer's interaction with the first agent, media capabilities of the customer communication device 108, formats in which the agent greeting was stored, etc.

After the non-default agent greeting has been played or presented to the customer, then the second agent is connected with the customer and the two parties are allowed to interact with one another (step 724).

While the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

The phrases "at least one", "one or more", "or", and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the invention is considered to include a tangible storage medium or distribution medium and prior art-recognized equivalents and successor media, in which the software implementations of the present invention are stored.

A "computer readable signal" medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine", "calculate" and "compute," and variations thereof, as used herein, are used interchangeably and include any type of methodology, process, mathematical operation or technique.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

It shall be understood that the term "means" as used herein shall be given its broadest possible interpretation in accordance with 35 U.S.C., Section 112(f). Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

What is claimed is:

1. A contact center, comprising:
   a server comprising:
      a microprocessor;
      a computer readable medium, coupled to the microprocessor and comprising instructions stored thereon that cause the microprocessor to:
         determine a context of a first interaction, the context being determined by the microprocessor analyzing media exchanged between a customer communication device and a first agent communication device during the first interaction between the customer communication device and the first agent communication device;
         select a second agent communication device associated with an agent other than an agent associated with the first communication device;
         in response to selecting the second agent communication device, select, from a repository of greetings for the second agent communication device utilized to introduce a communication comprising a second agent communication device, a greeting for the second agent communication device based on the determined context; and
         further in response to selecting the second agent communication device, transferring the first interaction from the first agent communication device to the second agent communication device; and
      wherein the microprocessor presents the selected greeting to the customer communication device prior to the communication comprising an exchange between the customer communication device and the second agent communication device.

2. The contact center of claim 1, wherein the repository of greetings for the second agent communication device comprises a default greeting and a non-default greeting.

3. The contact center of claim 2, wherein the selected greeting is the default greeting.

4. The contact center of claim 2, wherein the selected greeting is the non-default greeting.

5. The contact center of claim 2, wherein the microprocessor determines that a context of the first interaction is an abnormal interaction and selects the non-default greeting.

6. The contact center of claim 5, wherein the microprocessor detects a number of keywords, keyword types, or phrases in excess of a predetermined threshold for the keywords, keyword types, or phrases, respectively to determine the context of the first interaction being abnormal.

7. The contact center of claim 1, wherein the computer readable medium comprises a speech-to-text converter that causes the microprocessor to convert the media exchanged between the customer communication device and the first agent communication device to text and wherein the microprocessor performs a text-based analysis of the media exchanged between the customer communication device and the first agent communication device.

8. The contact center of claim 1, wherein the server further comprises an interface that is presented to the second agent communication device to customize the repository of greetings for the second agent communication device.

9. A communication system that enables communications between a customer communication device and contact center agent communication devices, the communication system comprising:
   a microprocessor;
   a computer readable medium comprising a repository of agent greetings, the repository of agent greetings comprising a set of agent greetings for presentation to the customer communication device that is connected with a first agent communication device; and
   a network interface;
   wherein the computer readable medium comprises instructions stored thereon that cause the microprocessor to configure the first agent communication device with a selected greeting from the set of agent greetings to the customer communication device when the customer communication device is transferred to the first agent communication device, and wherein the selected greeting is selected from the set of agent greetings based, at least in part, on a determined context that is determined from a previous interaction between the customer and another agent communication device other than the first agent communication device; and wherein the microprocessor presents the selected greeting to the customer communication device prior to a communication comprising an exchange between the customer communication device and the first agent communication device.

10. The communication system of claim 9, wherein the computer readable medium further comprises:
a conversational analysis engine that causes the microprocessor to determine the context based on media exchanged between the customer communication devices and the another agent communication device.

11. The communication system of claim 9, wherein the set of agent greetings comprises a default greeting and a non-default greeting.

12. The communication system of claim 11, wherein the selected greeting is the default greeting.

13. The communication system of claim 11, wherein the selected greeting is the non-default greeting.

14. The communication system of claim 9, wherein the microprocessor causes a media file of the selected greeting to be played to customer communication device via the network interface.

15. A method of operating a contact center, comprising:
receiving, by a microprocessor, media exchanged between a customer communication device and a first agent communication device during a first interaction between the customer communication device and first agent communication device;
analyzing, by the microprocessor, the received media;
based on the analysis of the received media, determining, by the microprocessor, a context of the first interaction;
determining, by the microprocessor, that the customer communication device is being transferred to a second agent communication device;
mapping, by the microprocessor, the context to a playback condition associated with a plurality of agent greetings for the second agent communication device;
based on the mapping, selecting, by the microprocessor, an agent greeting from the plurality of agent greetings, wherein the selected agent greeting comprises an associated playback condition that correlates with the context; and
causing, by the microprocessor, the second agent communication device to be configured to present the selected agent greeting to the customer communication device when the customer communication device is transferred to the second agent communication device; and
wherein the microprocessor causes the second agent communication device to present the selected greeting to the customer communication device prior to a communication comprising an exchange between the customer communication device and the second agent communication device.

16. The method of claim 15, further comprising:
prohibiting, by the microprocessor, the second agent communication device from delivering media to the customer communication device until the selected agent greeting has been fully presented to the customer communication device.

17. The method of claim 15, further comprising:
conferencing, by the microprocessor, the customer communication device and the second agent communication device with a media server that provides the selected agent greeting to the customer communication device while the second agent communication device is muted.

18. The method of claim 15, further comprising:
transferring the customer communication device to a third agent communication device; and
presenting a second selected agent greeting to the customer communication device while the customer communication device is being transferred to the third agent communication device.

19. The method of claim 15, wherein the plurality of greetings comprises a default greeting and a non-default greeting.

20. The method of claim 19, wherein the selected agent greeting is the non-default greeting.

* * * * *